June 13, 1972  L. W. CORNELL  3,669,787
FLEXIBLE DEFORMABLE SELF-SUPPORTING GLASS FRIT SEALING TAPE
Filed Aug. 8, 1968
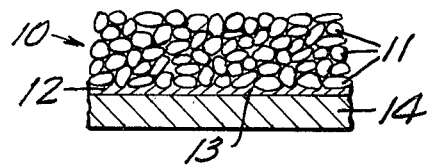
INVENTOR.
LEW WALLACE CORNELL
BY Kinney, Alexander,
Sell, Steldt & DeLaHunt
ATTORNEYS

United States Patent Office

3,669,787
Patented June 13, 1972

3,669,787
FLEXIBLE DEFORMABLE SELF-SUPPORTING GLASS FRIT SEALING TAPE
Lew Wallace Cornell, Mound Village, Minn., assignor to Minnesota Mining and Manufacturing Company
Filed Aug. 8, 1968, Ser. No. 751,088
Int. Cl. C09j 7/02
U.S. Cl. 161—167                4 Claims

ABSTRACT OF THE DISCLOSURE

Sheet material formed from glass frit bonded with a minor amount of heat-depolymerizable rubbery polymer, preferably coated on one or both surfaces with a small amount of similarly depolymerizable pressure-sensitive adhesive, can be used to join glass or other inorganic substrates. When subjected to heat, the rubber depolymerizes and volatilizes and the frit thereafter fuses, resulting in a strong nonporous inorganic seal. One use for the product is in the formation of color TV picture tubes.

BACKGROUND OF THE INVENTION

The invention relates to means for and methods of securing adhesion to ceramic, glass or metal surfaces.

Cathode ray tubes, e.g. the type used as picture tubes in television sets, are typically formed from two separate glass units—a funnel and a face plate. The interior of the face plate, which resembles a shallow dish, is first coated with the phosphors which yield the picture when struck by electrons projected from the cathode. In black and white picture tubes, the face plate is superposed on the funnel and the two then fused with a gas flame. This technique cannot be used on color TV picture tubes, however, since the heat tends to warp the metal shadow mask which is an integral part of the face plate portion. For color tubes, the funnel is placed in a jig, and a thin bead of a thixotropic dispersion of glass frit in an amyl acetate solution of nitrocellulose is supplied under pressure and laid around the large end of the funnel; the bead may then be dried 10-30 minutes at room temperature to evaporate the solvent. The face plate is next carefully positioned so that its edges coincide with those of the funnel, and the thus-assembled parts held in place. The assembly is passed through a lehr oven, which first burns out the nitrocellulose and then fuses the frit. This method of manufacture is slow, difficult to control, causes noxious fumes, entails an extremely high labor cost, and may result in as high as 40% rejects; a reject tube, of course, must be separated into the funnel and face plate components for reworking.

It is also difficult to remove the nitrocellulose binder completely, and any carbonaceous residue tends to promote breakdown when the tube is subjected to the extremely high voltages—e.g., 25 or 30 kv., which are normally encountered in operation.

Sheet material in which fusible glass frit is bonded with rigid or plasticized organic material is old in the art; see, e.g., British Pat. 1,066,673. For several years there has been a commercial product available formed from glass frit bonded together with about 25–65% by volume (based on the frit) of poly n-butylmethacrylate, one face of the structure optionally being provided with a normally tacky and pressure-sensitive adhesive. Such prior art products, however, cannot be used in the manufacture of television tubes, because of two serious problems. First of all, it is virtually impossible to eliminate carbonaceous residue when these products are subjected to the heating cycle which fuses the frit. Secondly, organic binder which remains and disintegrates after the frit melts, causes bubbling and an undesirable porous bond. Similar problems arise when attempts are made to use these prior art products to decorate inorganic surfaces or to embed glass or metal fibers in a matrix of glass. The limiting characteristics of the prior art tape product are tacitly recognized by the manufacturer, who provides it only in thin (0.0005–0.010") layers.

Still another disadvantage of the prior art tape product is its inability to be stretched or bent around sharp corners without breakage.

Because of the problems just discussed, the thin prior art product must not be laid up to form thick layers and hence cannot be used for such applications as a coil wrap for large transformer conductors which are exposed to high radiation intensity, e.g. $10^{14}$ rad, the porous and/or carbon-containing bond proving electrically unsuitable. Similarly, a product which bubbles when used as the matrix in the manufacture of light-weight boron fiber-reinforced body armor is essentially useless.

SUMMARY OF THE INVENTION

The present invention makes it possible to assemble cathode ray tubes, including color TV picture tubes, simply and conveniently, providing—for the first time, it is believed—bonded frit sheet material which is flexible, stretchy, conformable, readily held in position, and capable of yielding entirely inorganic bonds. Seals made with this novel sheet material do not contain carbon, and hence are able to resist extremely high voltages without breakdown. During the period of frit fusion formation there is essentially no escape of volatile material, making it possible to form void-free seals. The product of this invention can be used to form thick glass seals or coatings, e.g., for the encapsulation of banks of hollow copper conductors in transformers.

The sheet material of this invention has a superficial resemblance to those taught by the prior art in that a layer of fusible glass frit is united by an organic binder and provided with a tacky surface for holding it in place. There, however, the similarity ends. The binder of the invention, as well as any separate adhesive coating employed, is stretchy, heat-depolymerizable and volatile at a temperature below that at which the frit melts. These physical characteristics permit the novel sheet material to be bent around the corners of TV tubes and to form void-free, carbon-free electrically superior all-glass seals. Rubbery polymers or copolymers based on isobutylene, butene, and butyl rubber have been especially satisfactory for use as both the frit binder and the rubber in rubber-resin pressure-sensitive adhesive coating. These polymers are characterized by heat-instability and free-radical-chain depolymerization or depropagation, one monomer at a time, a characteristic shared with such polymers as polymethyl methacrylate, polytetrafluoroethylene, and α-methylstyrene; see, e.g., Schildknecht, Polymer Processes, Interscience Publishers Inc., New York, 1956, pp. 525–528, and Schildknecht, Vinyl and Related Polymers, John Wiley & Sons, New York, 1952, pp. 217–8, 542, 560.

Other rubbery polymers lacking heat stability, characterized by a tendency to volatilize, and considered attractive for use in the practice of this invention include rubbery propylene:ethylene copolymers; rubbery propylene:ethylene:diene terpolymers; rubbery olefin homopolymers or copolymers from normal or branched α-olefin monomers containing 4 to 10 carbon atoms; rubbery copolymers of isobutylene with less than 15 mol percent of a toughening or modifying monomer, etc. Still other heat-unstable polymers include the more extensible polymers, which decompose into monomeric formaldehyde below 100° C.; see, e.g., Neiman, Aging and Stabilization of Polymers, Consultants Bureau Enterprises, Inc., New York, 1965.

It will be noted that whereas heat-instability is typically considered a fatal defect in a polymer, the present invention takes advantage of the very quality which has been heretofore been decried.

The present invention stems from work disclosed in my prior U.S. Pat. No. 3,372,852, which describes a welding backup tape in which a layer of bonded refractory particles is carried by a strip of heat-resistant pressure-sensitive adhesive tape. The structures there disclosed, and the purpose for and method in which the structures are used, is distinctly different.

BRIEF DESCRIPTION OF THE DRAWING

Understanding of the invention will be enhanced by referring to the accompanying drawing, the single figure of which depicts an edge view of a novel tape structure made in accordance with the invention.

In the drawing, self-supporting layer 10 is formed of glass frit particles 11 bonded together by binder 12. Over one face of layer 10 is a thin stratum of normally tacky and pressure-sensitive adhesive 13, protectively covered by removable liner 14.

DESCRIPTION OF THE PRESENTLY PREFERRED EMBODIMENTS

Understanding of the invention will be further increased by referring to the following illustrative but nonlimiting examples. All parts are by weight unless otherwise noted.

Example 1

A low-melting glass frit containing approximately 60% lead, 15% zinc, 2% barium, 3% boron, 1.5% silicon, and trace amounts of strontium, iron, magnesium, calcium, and silver (commercially available from Owens-Illinois, Inc., as CV-130 solder glass) was obtained. To 100 parts of this frit was added 20 parts of a 10% heptane solution of polyisobutylene having an average molecular weight (MW) of about 108,000 (commercially available from Enjay Chemical Company under the trademark designation "Vistanex" L-120). The frit had a particle size in the range of approximately 1-100 microns and a surface area on the order of 800 cm.$^2$/g.; cf. discussion of J. W. Mellor's standard surface factor in Singer and Singer, Industrial Ceramics, Chapman and Hall, London, England, 1963, pp. 292-294.

A silicone-treated flat stock paper liner was lightly primed by coating with a 5% solution of the polyisobutylene referred to in the preceding paragraph and the solvent evaporated. Over the polyisobutylene coating was then applied four separate coatings of the mixture referred to in the preceding paragraph, solvent being evaporated between coats, to leave a final dried thickness of approximately 0.05" (1.25 mm.). To the exposed surface was then applied a thin layer of pressure-sensitive adhesive formed from a 2:1 blend of 108,000 MW polyisobutylene ("Vistanex" L-120) and 9400 MW polyisobutylene ("Vistanex" LM-MS). The resultant tape could be handled in narrow widths, was extremely flexible, and could be bent edgewise around the contours of a rectangular TV tube face plate, where the tacky adhesive held it in place.

To test the effectiveness of the tape of this example in sealing glass, two 4" x 4" x 3/16" glass plates were obtained. The edge of one plate was then adhered to the center of a 3/8" x 4" strip of the tape described in the preceding paragraph. This plate was then mounted loosely in a vertical frame and placed, taped edge down, along the center of the other plate, which was horizontally disposed. The two plates thus formed an inverted T, the tape separating the lower edge of the vertical plate from the upper surface of the horizontal plate.

Loops of No. 24 Nichrome wire were forced into the exposed tape, one on each side of the vertical plate, so that the wires were approximately 1/4" apart. Another small piece of the same tape was then placed on top of each such loop and pressed as a fillet into the angle of the joint so that part of the tape was on the vertical plate and part on the horizontal plate. A weight was placed on each pair of extended wires to hold them in position. The assembly was then heated 45-60 minutes at 320° C. raised to 450° C. in 17-20 minutes, held at 450° C. for 50-60 minutes, and allowed to cool slowly. The glass frit fused, forming a strong, sound grayish-brown seal which uniformly wet and joined the two plates. When 40 kv. was applied across the seal through the wire for one minute, no failure occurred.

The tape construction described in the preceding paragraph contained 2% binder by weight based on the frit, or, taking into consideration the relative densities of the binder and the frit, approximately 14.2% binder by volume based on the frit. Although as high as approximately 35% binder by volume can be employed, it has been found that no more than about 20% should be employed in a tape for use in making TV picture tubes. Larger quantities tend to be difficult to purge from the system without the creation of voids in the seal. The amount of binder required is directly related to the surface area factor of the frit employed.

The high lead content in the frit of this example contributed to the relatively low melting point. The zinc tended to promote devitrification or crystallization of the fused frit, thereby raising the melting point of the seal above that of the precursor frit.

Example 2

Example 1 was repeated, except that the volume of polyisobutylene binder was reduced to 7.1%. The finished sheet was significantly more fragile than that of Example 1, but was strong enough to be handled carefully. The seal obtained was lighter in color than that obtained in Example 1.

Example 3

To 100 parts of the solder glass frit described in Example 1 were added 3.3 parts of toluol and 9.3 parts of a 21.6% toluol solution of >97:<3 isobutylene:isoprene copolymer, having an average molecular weight of approximately 350,000 (commercially available from Enjay Chemical Company as Butyl 365). The amount of binder was about 14.2% by volume. The mixture was cast into sheet form as in Example 1 and then transfer coated with a thin layer of pressure-sensitive adhesive of the type described in Example 1 tackified with a small amount of a soft polyterpene resin (commercially available from Pennsylvania Industrial Chemical Co. under the trademark designation "Piccolyte" S-25). The finished tape was flexible and conformable, seals made therewith being slightly darker than those made with the tape of Example 1. The seals withstood 40 kv. for one minute when tested as described in Example 1.

Example 4

To 100 parts of the glass frit described in Example 1 was added 10 parts of toluol and 11.5 parts of a 13% 70/30 trichloroethylene/toluol solution of 90:10 "Vistanex" L-120:"Vistanex" LM-MS and 2.5 parts of a 20% solution of a methyl:vinylsiloxane polymer (commercially available from General Electric Company under the trade designation SE-31 gum). The mixture was cast into sheet form and coated with adhesive as in Example 1. The resultant tape was flexible, strong enough to be handled readily, and made seals that were light in color and withstood 40 kv. for one minute. The binder in this example constituted 14.0% by volume.

Example 5

To 100 parts of a low-melting glass frit having a composition similar to that of Example 1 but a particle size range of approximately 1 to 140 microns and a calculated surface area of 847 cm.$^2$/gm. commercially available from Corning Glass Company under the trade designation "Pyroceram" 7572) was added 10.3 parts of toluol and 13.3 parts of a 15% solid solution of "Vistanex" L-120 in toluol. This mixture was cast into a sheet and coated with adhesive as described in Example 1. The resultant tape, which contained 13.9% binder by volume, was strong and flexible and made seals which withstood 40 kv. for one minute.

It has been found that the use of frit having a surface factor as high as approximately 2,000 cm.$^2$/gm. requires more binder than can be removed effectively, and it is accordingly preferred that the surface factor be less than about 1,000 cm.$^2$/gm. On the other hand, the upper limit for particle size appears to be imposed by the consideration of getting a reasonably smooth sheet.

The principles of this invention can be embodied with higher melting frits than those having particular utility in the electrical industry; see for example, those listed in the table below:

|  | Frit | | | |
| --- | --- | --- | --- | --- |
|  | A | B | C | D |
| Percent oxide: | | | | |
| Li$_2$O | 1.7 | 0.3 | | |
| K$_2$O | 1.1 | 1.5 | | |
| Na$_2$O | 2.2 | 0.3 | | |
| CaO | 7.1 | 0.1 | 45.0 | 2.2 |
| MgO | 3.3 | 0.1 | | 10.4 |
| SrO | 8.5 | | | |
| ZnO | | 1.0 | | |
| Al$_2$O$_3$ | 8.0 | 0.9 | | 14.4 |
| B$_2$O$_3$ | 9.1 | 26.2 | 29.2 | 29.0 |
| SiO$_2$ | 59.1 | 69.6 | 26.8 | 44.0 |
| Melting range, °F | 1,430–1,530 | 1,430–1,700 | 1,700–1,800 | 1,750–1,850 |
| Fusing temp., °F | 1,700 | 1,850 | 1,950 | 2,050 |

For glasses such as those shown in the preceding table, somewhat more heat-resistant binders may be employed. In any event, however, it is important that the binders substantially volatilize before the frit starts to melt. If this does not occur, the frit tends to skin over, entrapping the binder and resulting in bubbling. Such porosity in the finished product introduces both mechanical and electrical weaknesses, and may completely destroy the utility of the tape.

It will be appreciated that the principles of this invention may also be applied in such diverse fields as glass blowing, art, architecture, temperature-sensitive seals, tank linings, bonding of inorganic particulate matter such as glass beads or abrasive particles to metallic substrates, etc.

What is claimed is:

1. A sheet material having the ability to permanently join inorganic substrates such as glass, with an inorganic glass bond, comprising in combination:
a flexible, deformable, self-supporting layer of fusible glass frit held together by a rubbery extensible, heat-unstable synthetic polymeric organic binder which depolymerizes by free-radical-chain depropagation and volatilizes at a temperature below that at which the frit melts, said binder constituting a minor amount, sufficient to hold the frit together but no more than about 35% by volume of said frit.

2. The product of claim 1 wherein the binder constitutes at least about 5% by volume of said frit.

3. The product of claim 2 wherein at least one surface of said layer is tacky.

4. The product of claim 2 wherein the binder consists essentially of elastomeric material selected from the class of polyisobutylene, polybutene and butyl rubber.

References Cited
UNITED STATES PATENTS

| | | | |
|---|---|---|---|
| 2,946,370 | 7/1960 | Muttera | 156—302 |
| 3,047,418 | 7/1962 | Compton | 156—89 |
| 3,056,184 | 10/1962 | Blaha | 156—89 |
| 3,184,370 | 5/1965 | Luks | 161—193 |
| 3,227,591 | 1/1966 | Lambert et al. | 156—89 |
| 3,372,105 | 3/1968 | Johnson | 161—205 |

CARL D. QUARFORTH, Primary Examiner

S. J. LECHERT, Jr., Assistant Examiner

U.S. Cl. X.R.

161—406; 260—37